E. Cash,
Pipe Wrench.
N°. 62,250.  Patented Feb. 19, 1867.
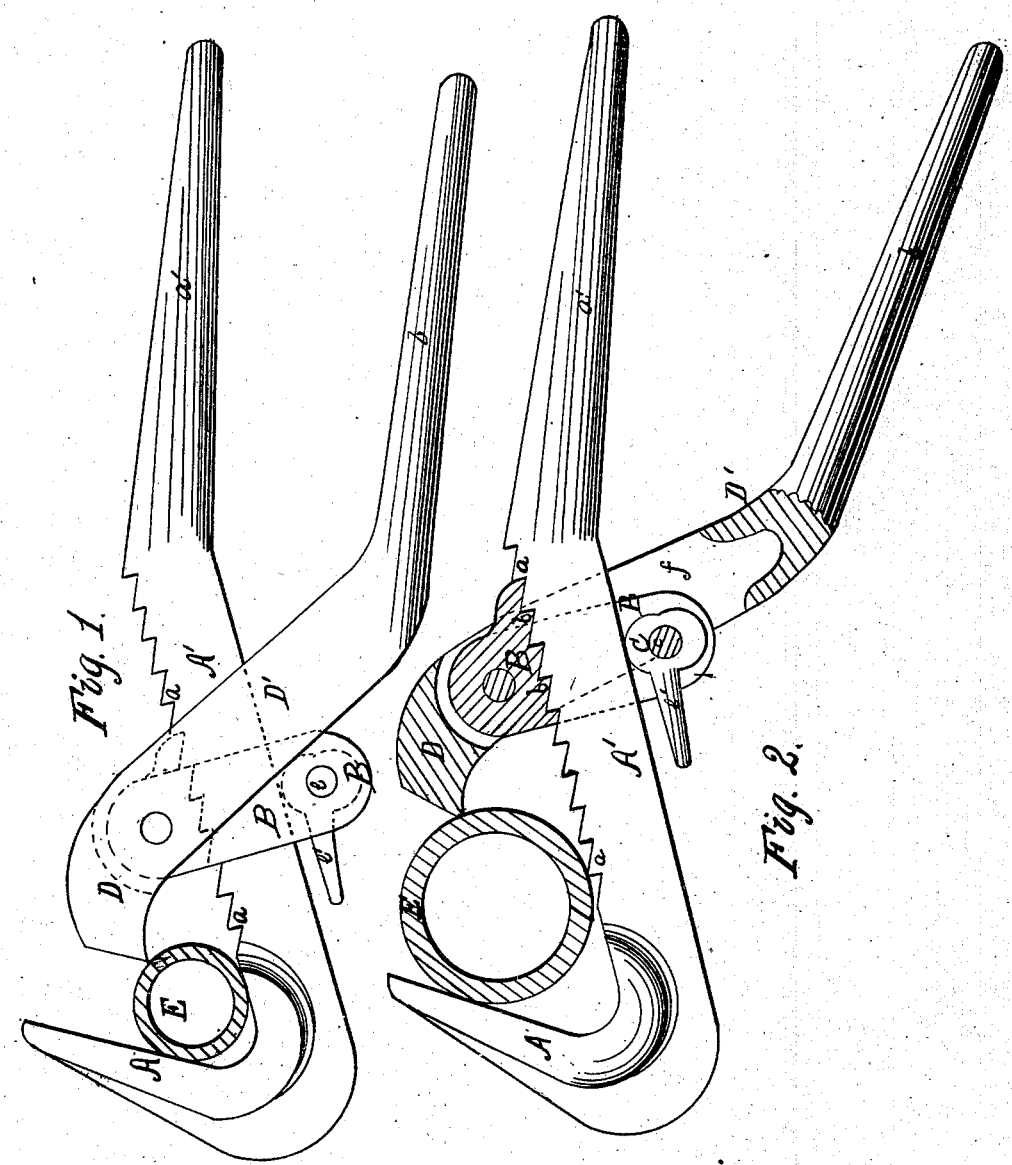
Witnesses:
J. W. Coomby
G. W. Reed
Inventor:
Elijah Cash

United States Patent Office.

ELIJAH CASH, OF BROOKLYN, NEW YORK.

Letters Patent No. 62,250, dated February 19, 1867.

IMPROVEMENT IN PIPE-TONGS.

The Schedule referred to in these Letters Patent and making part of the same.

TO ALL WHOM IT MAY CONCERN:

Be it known that I, ELIJAH CASH, of Brooklyn, in the county of Kings, and State of New York, have invented a new and useful Improvement in Pipe-Tongs; and I do hereby declare that the following is a full, clear, and exact description of the same, reference being had to the accompanying drawings, making a portion of this specification, in which—

Figure 1 is a side view of a pipe-tongs constructed according to my invention.

Figure 2 is a partial longitudinal section of the same.

Similar letters of reference indicate corresponding parts in both figures.

This invention consists in a novel arrangement of a pivoted biting jaw and toothed adjustable slide in relation with each other and with the serrated shank of the fixed jaw of the tongs, and the cam by which the aforesaid slide is held in position, whereby the tongs may be very easily and conveniently adjusted to any size of pipe required, and whereby a very powerful grip upon the pipe is secured.

To enable others to understand the construction and operation of my invention, I will proceed to describe it with reference to the drawings.

The fixed jaw of the tongs is shown at A, and the inner side or surface thereof is intended to be made flat, and is situated at an acute angle to the inner side or edge of the shank A' thereof, the portion of the said inner edge of the shank A' nearest the fixed jaw A, being serrated, or, in other words, formed with angular teeth, as represented at $a$ in the drawing. That end of the shank A' opposite to that at which the jaw A is formed, is shaped into a handle, as shown at $a'$. B represents an adjustable slide, which is constructed with a deep slot or groove, which extends entirely through the outer end of the said slide, and through which the shank A' is passed, the innermost end of the said slot being formed with angular teeth, $b$, which interlock or fit between the teeth $a$ of the shank A, as shown more clearly in fig. 2. Pivoted in the outer end of the aforesaid slot by a transverse pin, $c$, behind the shank A', is a cam, C, which is so shaped that when the lever $c'$ thereof is in a position nearly or quite at right angles to the aforesaid shank, the slide B will be loosened, so that the teeth $b$ thereof may be brought away from the toothed or serrated edge of the shank A, and the said slide moved longitudinally upon the said shank to any desired position according to the size of pipe to be turned or acted upon by the tongs, and when turned into a position nearly or quite parallel with the shank A, will force the teeth $b$ against the aforesaid toothed or serrated edge of the shank, and thus firmly lock the slide in position upon the said shank. The biting jaw is shown at D, and has a large slot, $e$, formed within its shank D', as shown at $f$, the opposite end of the shank D' of the jaw D being shaped into a handle, $b'$. The slot $e$ is of such size and shape as to permit the slide B to work through the same, the said slide having its innermost end pivoted in the end of the said slot by means of a strong transverse pin, as shown at $g$ in the drawings.

In using the tongs, the slide B is first adjusted at the proper point upon the shank A', as hereinbefore fully set forth. The two handles, $a'$ $b'$, are grasped in the hand and forced toward each other, the pipe E being held between the angular inner sides of the fixed jaw A and the shank thereof, and the sharp angular edge $i$ of the biting jaw D, as represented in the drawing; the biting action of the said sharp edge of the jaw D effectually preventing the pipe from turning within the tongs. By pivoting the jaw D to the innermost end of the slide B, as hereinbefore explained, the jaw D may be made much shorter than would be the case if the pivot thereof was situated behind the shank A', and in consequence of this the leverage exerted thereon by the shank D' thereof is proportionally increased, thus enabling the aforesaid biting jaw to take a very much firmer hold upon the pipe in turning the same.

What I claim as my invention, and desire to secure by Letters Patent, is—

The pivoted biting jaw D, and toothed adjustable slide B, in combination with each other, and with the serrated shank of the fixed jaw A, and the locking cam C, substantially as herein set forth for the purpose specified.

ELIJAH CASH.

Witnesses:
   J. W. COOMBS,
   GEO. A. REED.